United States Patent
Reed et al.

(10) Patent No.: US 7,054,987 B1
(45) Date of Patent: May 30, 2006

(54) APPARATUS, SYSTEM, AND METHOD FOR AVOIDING DATA WRITES THAT STALL TRANSACTIONS IN A BUS INTERFACE

(75) Inventors: David G. Reed, Saratoga, CA (US); Brian K. Langendorf, Benicia, CA (US); Brad W. Simeral, San Francisco, CA (US); Anand Srinivasan, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 145 days.

(21) Appl. No.: 10/741,069

(22) Filed: Dec. 19, 2003

(51) Int. Cl.
*G06F 13/00* (2006.01)
*G06F 13/14* (2006.01)
*G06F 13/38* (2006.01)
*G06F 11/00* (2006.01)
*G06F 12/00* (2006.01)

(52) U.S. Cl. .......................... 710/310; 710/52; 718/104
(58) Field of Classification Search ................ 710/310, 710/52, 105, 56, 100, 305, 107, 112; 718/101, 718/102, 104; 711/140, 169; 712/29, 220; 702/182, 188; 370/401, 402; 709/253; 714/2; 361/737, 783
See application file for complete search history.

(56) References Cited

U.S. PATENT DOCUMENTS

| | | | |
|---|---|---|---|
| 5,561,823 A * | 10/1996 | Anderson | 710/52 |
| 5,613,075 A * | 3/1997 | Wade et al. | 710/107 |
| 5,857,097 A * | 1/1999 | Henzinger et al. | 712/236 |
| 6,078,976 A * | 6/2000 | Obayashi | 710/315 |
| 6,134,638 A * | 10/2000 | Olarig et al. | 711/167 |
| 6,433,785 B1 * | 8/2002 | Garcia et al. | 345/531 |
| 6,556,952 B1 * | 4/2003 | Magro | 702/183 |

OTHER PUBLICATIONS

"A novel reordering write buffer to improve write performance of log-structured file systemn" by Jun Wang and Yiming Hu☐☐(abstract only) Publication Date: Dec. 2003.*
Shanley, "Pentium® Pro and Pentium® II System Architecture," Second Edition, *Addison-Wesley*, ©*1998 by MindShare, Inc.*, 6th printing Jan. 2001, Chapter 8 to 13 (199-348).

* cited by examiner

*Primary Examiner*—Gopal C. Ray
(74) *Attorney, Agent, or Firm*—Cooley Godward LLP

(57) ABSTRACT

A bus interface unit is adapted to receive transaction requests for at least two different targets. The bus interface unit monitors a capacity of a resource associated with servicing transaction requests to the targets, such as a posted write buffer. If a transaction request would fill the resource beyond a current remaining capacity of the resource such that the execution of other pipelined transactions would become stalled, the bus interface generates a retry response so that the request is retried at a later time, permitting other transactions to proceed while the resource drains.

14 Claims, 7 Drawing Sheets

| Time | Address | Snoop | Response | Data |
|---|---|---|---|---|
| | A1 (NS) | | | |
| | A2 (NS) | S1 | | |
| | A3 (NS) | S2 | R1 | |
| | A4 (NS) | S3 | R2 | D1 |
| | A5 (S) | S4 | R3 | D1 |
| | | | | D2 |
| | A6 (S) | S5 | R4 (Retry) | D2 |
| | | | | D3 |
| | A7 (S) | | R5 | D3 |
| | | | | --- |
| | A4 (NS) | | R6 | --- |
| | | | | D5 |
| | | | R7 | D5 |
| | | | | D6 |
| | | | R4 (Accept) | D6 |
| | | | | D7 |
| | | | | D7 |
| | | | | D4 |
| | | | | D4 |

*FIG. 8*

APPARATUS, SYSTEM, AND METHOD FOR AVOIDING DATA WRITES THAT STALL TRANSACTIONS IN A BUS INTERFACE

FIELD OF THE INVENTION

The present invention is generally related to bus interface protocols. More particularly, the present invention is directed towards reducing latency in transaction requests serviced by a bus interface protocol.

BACKGROUND OF THE INVENTION

Microprocessors commonly include protocols for transferring data across a processor bus to other units of a system. In particular, the Pentium® class microprocessors sold by the Intel Corporation of Santa Clara, Calif. have a well-defined front side bus interface protocol.

FIG. 1 illustrates a prior art processor cluster 100 for Pentium® class microprocessors. The processor cluster 100 refers to one or more processors that reside on the Pentium® front side bus 115 (e.g., typically one to four processors), which is illustrated in the example of FIG. 1 as the "Pentium Pro Bus" line. Other components, such as a main memory 120 and one or more bridges 130, may be coupled to bus 115. A bridge 130 may, in turn, act as a surrogate for addressing other entities coupled to the bridge. An individual bridge 130 may, in turn be coupled to other buses 140, such as peripheral component interconnect (PCI) buses which in turn may be coupled to other bridges 150 and buses. Other components, such as an advanced programmable interrupt controller (APIC) 190 and an APIC bus 195 may also be included in processor cluster 100.

There is a well-defined front side bus protocol for Pentium class processors, which is described in the book entitled "Pentium® Pro and Pentium® II System Architecture", second edition, chapters 8–17, by Tom Shanley, Addison-Wesley (1998), the contents of which are hereby incorporated by reference. Each CPU 110 includes a front side bus interface. Additionally, other modules coupled to the front side bus 115, such as bridge 130, also include a corresponding front side bus interface.

A front side bus interface may include three types of agents: a request agent that initiates a transaction (a transaction initiator); a response agent, which is the target of a transaction; and a snoop agent, which snoops snoop caches of target devices. FIG. 2 illustrates bus signals entering and leaving a bus agent 200. The signals may include snoop phase signals 205, request phase signals 210, response phase signals 215, data phase signals 220, and error phase signals 225. Each signal group is used during a particular phase of the transaction.

The Pentium® front side bus 115 is a pipelined bus with in-order data movement. A defer mechanism allows for a limited amount of reordering of data movement. However, the defer mechanism increases overhead and is therefore often not used. Thus, typically once a transaction is initiated, the transaction phases proceed in a predefined order. For the Pentium Pro®, these include: an arbitration phase for an agent to gain access to the bus, a request phase for an initiating agent to issue a transaction request to a target, an error phase (e.g., a parity bit check by a request agent to determine if a request was received without error), a snoop phase for a the request agent to snoop the snoop cache of targets, a response phase for a target to deliver a response regarding how it will reply to a request, and a data phase for a data transfer associated with an accepted transaction to take place (e.g., a read or a write operation between the initiator and the target).

FIG. 3 illustrates an exemplary sequence 300 of pipelined transactions for a Pentium® front side bus interface. Since there is pipelined in-order execution of transactions, each new transaction that is scheduled cannot complete its data phase until the previous transaction has completed its data phase. However, the data phase of a transaction may be stretched out if the request and response agents are not ready to transfer the data. Thus, for example, a data phase 305 on one transaction may be stretched out compared to other transactions if, for example, the response agent is not immediately ready to transfer data.

A drawback of such a front side bus interface is that transactions can become stalled waiting for previous transactions to complete their data phase. For example, a data phase 310 of one transaction can become stalled because of a stretched out data phase 305 of a previous transaction. In some applications this can result in excessive latency for completing transactions. Additionally, since all transaction requests are scheduled and execute in-order, a stretched out data phase of a comparatively low-priority transaction can stall the completion of a higher-priority transaction. Additionally, in a bridge 130 coupled to two or more other entities, a stretched out data phase for a transaction addressed to one of the entities can stall transactions addressed to the other entity.

A front side bus is one example of a pipelined bus in which transactions can become stalled waiting for previous transactions to complete their data phase. More generally, other types of buses with similar principles of operation may experience similar problems.

Therefore, what is desired is an improved data management technique for a pipelined bus interface unit.

SUMMARY OF THE INVENTION

A bus interface unit has a mode of operation that includes pipelined, in-order completion of pipeline states and an ability to retry requests. The bus interface unit is adapted to receive transaction requests for at least two different targets. The bus interface unit monitors a capacity of a resource associated with servicing transaction requests to the targets, such as a posted write buffer. If a transaction request would fill the resource beyond a current remaining capacity of the resource such that the execution of other pipelined transactions would become stalled, the bus interface generates a retry response so that the request is retried at a later time, permitting other transactions to proceed while the resource drains.

In one embodiment the bus interface unit is a front side bus interface unit. In this embodiment, the front side bus interface unit receives transaction requests from a central processing unit (CPU) directed to at least two targets. The front side bus interface unit monitors a capacity of a posted write buffer. If a transaction request would generate a posted write beyond a current remaining capacity of the posted write buffer such that a stretched out data phase would result, the front side bus interface generates a retry response so that the request is retried at a later time, permitting other transactions to proceed while the posted write buffer drains.

In one embodiment, the bus interface unit is a front side bus interface unit disposed in an integrated circuit for bridging a CPU to at least two other units, such as a bridge for bridging a CPU with a system memory and a non-system memory. In one embodiment, the posted write buffer is a posted write buffer for non-system memory.

BRIEF DESCRIPTION OF THE FIGURES

The invention is more fully appreciated in connection with the following detailed description taken in conjunction with the accompanying drawings, in which:

FIG. 8 illustrates prevention of a stall in an exemplary sequence of front side bus transactions in accordance with one embodiment of the present invention.

Like reference numerals refer to corresponding parts throughout the several views of the drawings.

DETAILED DESCRIPTION OF THE INVENTION

Figure 1:
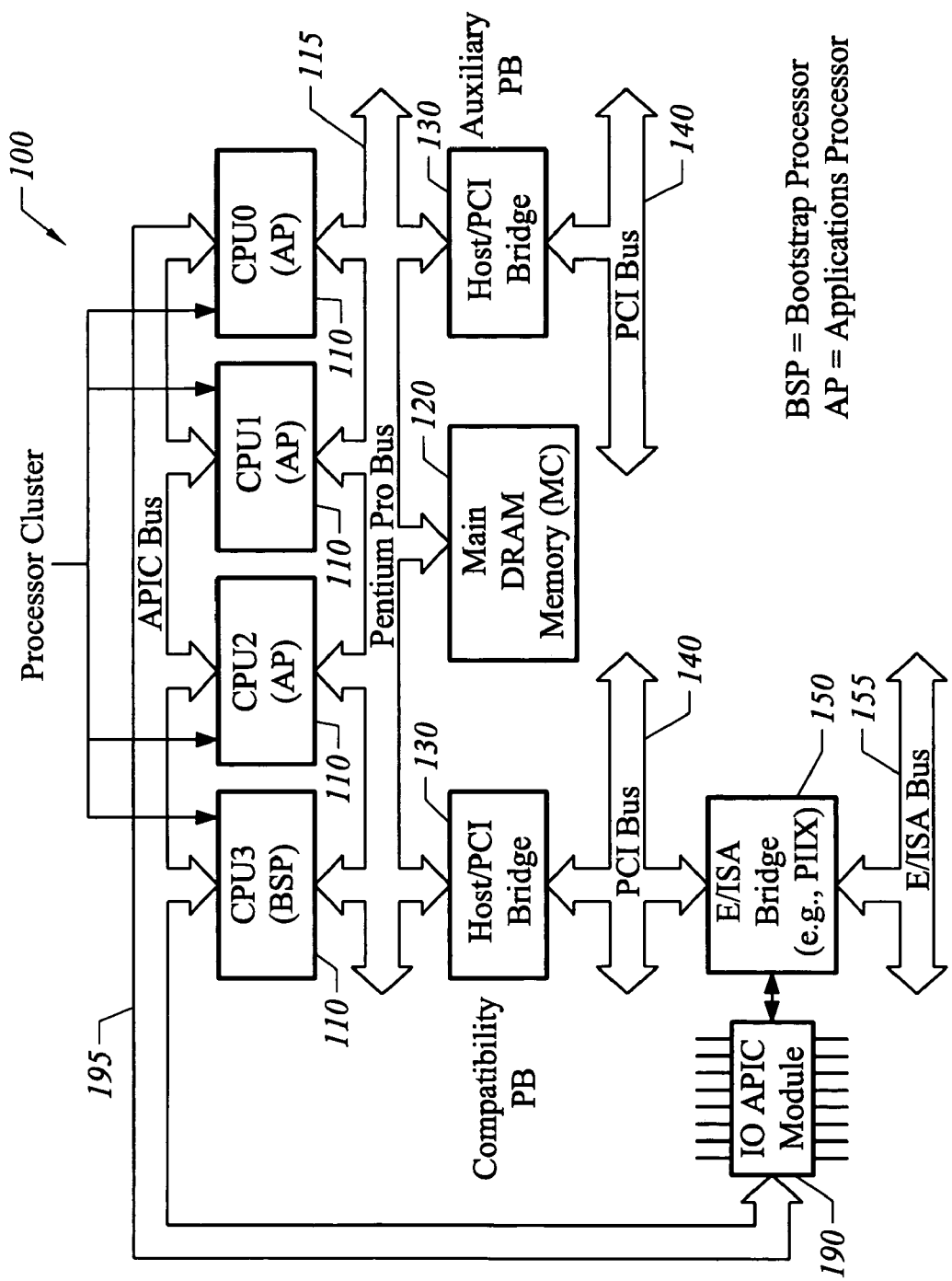
FIG. 1 is a block diagram of a prior art processor cluster having a front side bus.
Figure 2:
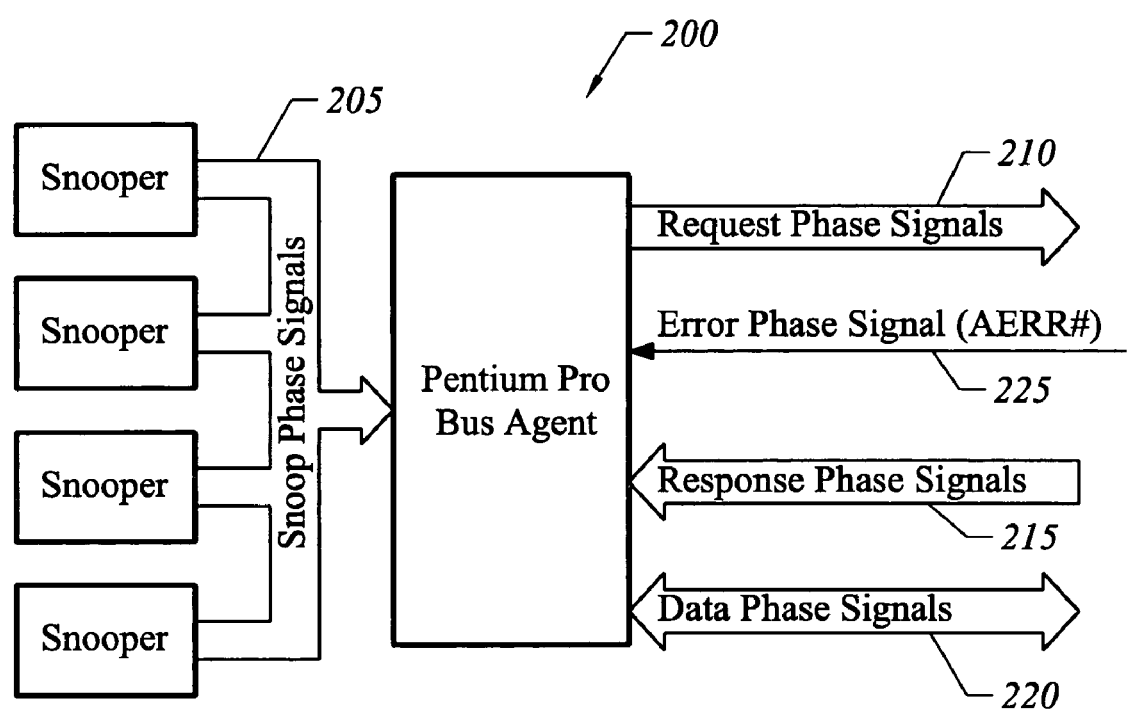
FIG. 2 is a block diagram of a prior art bus agent for a front side bus interface.
Figure 3:
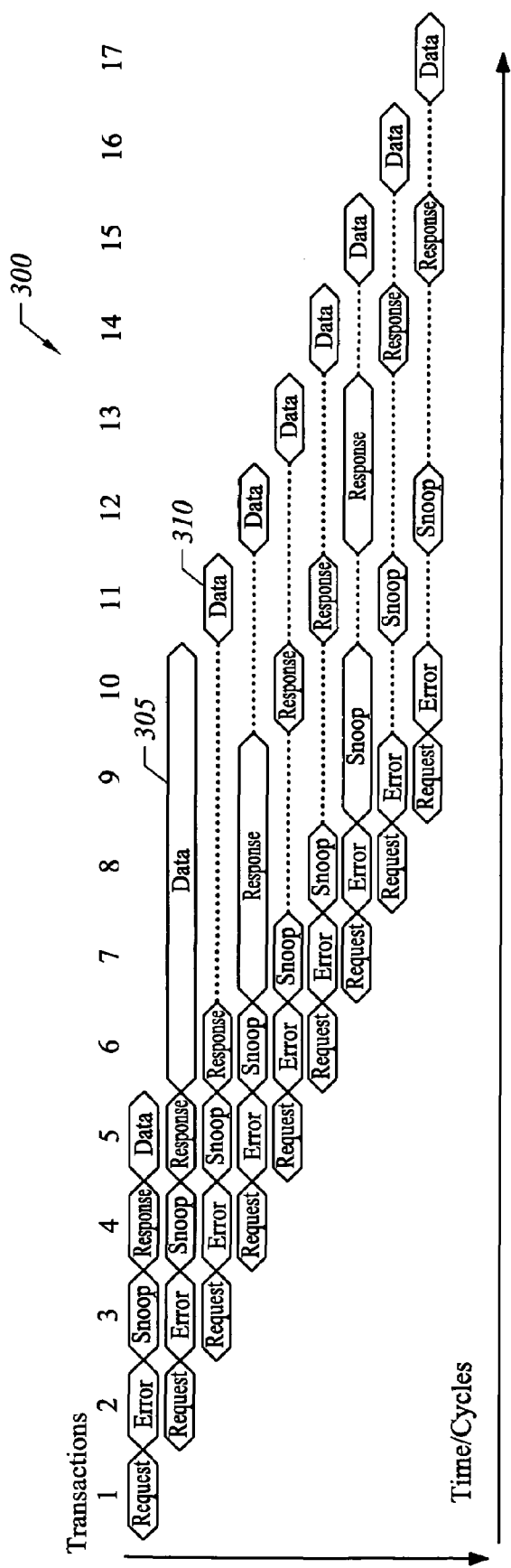
FIG. 3 is a prior art figure illustrating exemplary transaction phases in the front side bus interface of FIGS. 1–2.
Figure 4:
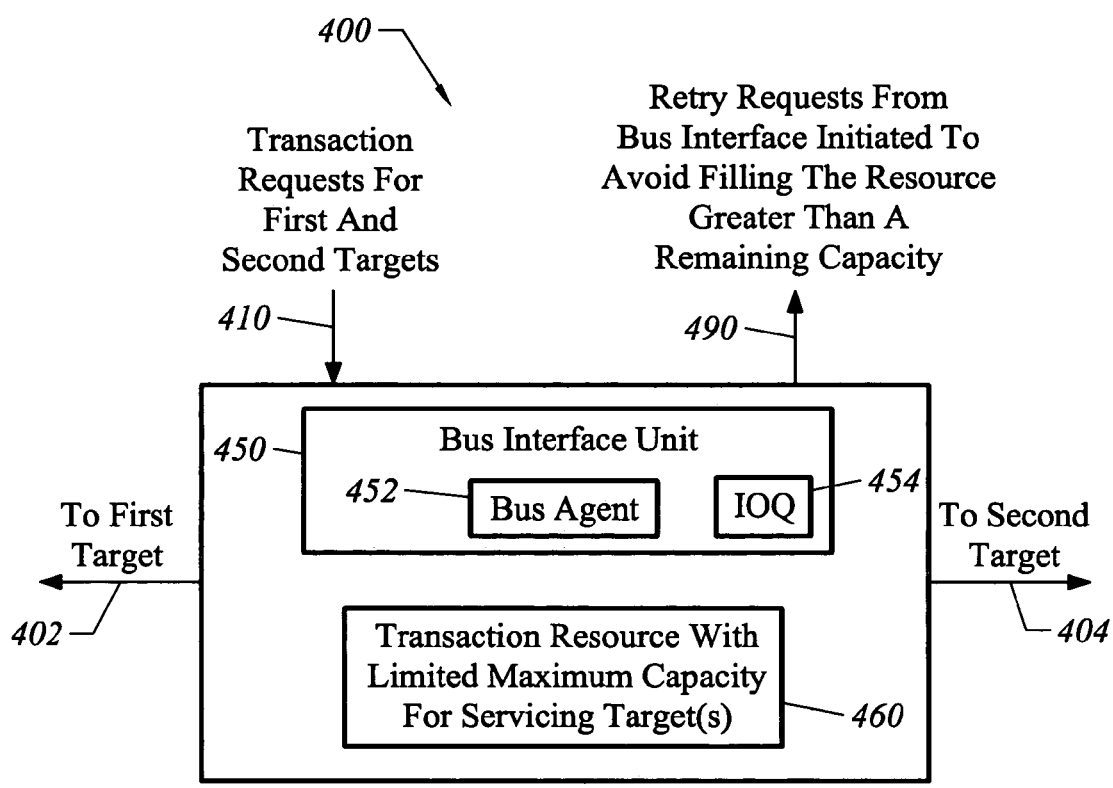
FIG. 4 is a block diagram of a bus interface in accordance with one embodiment of the present invention.

FIG. 4 illustrates an exemplary bus interface 400 in accordance with one embodiment of the present invention. A bus interface unit 450 receives transaction requests 410 for at least two targets 402 and 404. The bus interface unit 450 has at least one mode of operation in which it operates as a pipelined, in-order bus interface that has in-order completion of pipeline states. A bus agent 452 may be included to manage transactions. An in-order queue 454 may be included in bus interface 450 to maintain transactions in-order.

At least one resource 460 is associated with bus interface 450 for servicing a class of transactions associated with at least one of the targets 402 and 404. Resource 460 has a maximum capacity for servicing transactions. A transaction phase of a transaction request requiring resource 460 cannot be serviced until resource 460 recovers sufficient capacity to service the transaction phase. In one embodiment, resource 460 comprises a buffer for writing data associated with a transaction, such as a posted write buffer. Bus interface unit 450 is adapted to permit it to monitor the current remaining capacity of resource 460. Bus interface unit 450 is adapted to determine the effect of accepting a transaction request on resource 460. Bus interface unit 450 issues a retry request 490 for a transaction that cannot be immediately serviced with the current remaining capacity of resource 460. Thus, transaction requests likely to stall the progress of other transactions given the current state of resource 460 are identified and retried at a later time.

Bus interface 400 may be implemented in a variety of pipelined bus interface architectures. However, as described below in more detail, in one embodiment bus interface 400 is a front side bus interface.

Figure 5:
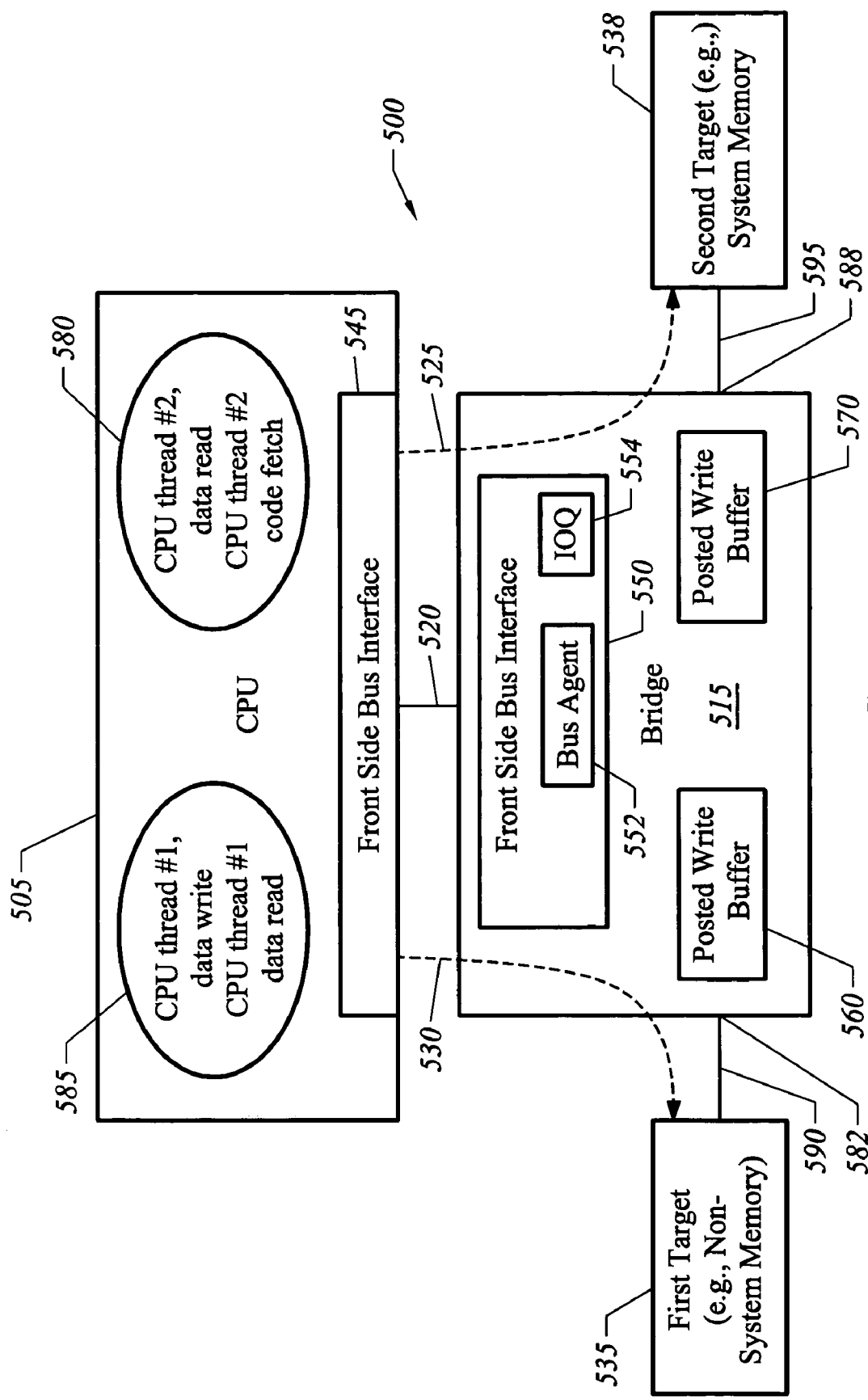
FIG. 5 is a block diagram of a front side bus interface for a computer system in accordance with one embodiment of the present invention.

FIG. 5 illustrates a front side bus interface for use in a computer system 500 in accordance with one embodiment of the present invention. In one embodiment, at least one central processing unit (CPU) 505 is coupled to a bridge integrated circuit 515 by a front side bus 520. CPU 505 may comprise a microprocessor. Bridge integrated circuit 515 may, for example, comprise part of a chipset, such as a North bridge chipset, such as the nForce™ chipset manufactured by the Nvidia Corporation of Santa Clara, Calif. Bridge integrated circuit 515 includes at least two ports 582 and 588 for coupling bridge integrated circuit 515 to other units 535 and 538.

Central processing unit (CPU) 405 includes a first front side bus interface unit 545. First front side bus interface unit 545 is a push-type bus that implements a pipelined in-order front side bus interface protocol for CPU 505.

Bridge integrated circuit 515 includes a second front side bus interface unit 550. Second front side bus interface unit 550 is adapted to execute a pipelined, in-order execution protocol compatible with that of first front side bus interface unit 545. This permits a request agent (not shown) associated with first front side bus interface 545 to issue transaction requests to a bus agent 552 in second front side bus interface 550. In one embodiment, second front side bus interface unit 550 includes an in-order queue (IOQ) 554 to keep track of transaction requests. Second front side bus interface unit 550 may be implemented in hardware, software firmware, or combinations of hardware and software.

Second front side bus interface unit 550 receives all transaction requests from CPU 505 that are addressed to at least two targets, such as units 535 and 538 coupled to bridge integrated circuit 515. Thus, for example, if two or more different units 535 and 538 are coupled to bridge integrated circuit 515 by respective buses 590 and 595, then CPU 505 may issue a transaction request to second front side bus interface unit 550 that is addressed to one of the individual units. Thus, IOQ 554 queues a sequence of transaction requests for all of the targets for which it receives transaction requests, such as units 535 and 538, based upon the order transactions are received.

Bridge integrated circuit 515 provides a first data path 525 (illustrated in phantom) for CPU 505 to access a second target (e.g., second unit 538). Bridge integrated circuit 515 provides a second data path 530 (illustrated in phantom) for CPU 505 to access a first target (e.g., unit 535).

In some embodiments, first unit 535 corresponds to a non-system memory and second unit 538 corresponds to a system memory. In these embodiments, first data path 525 may correspond to a first class of memory transaction requests for system memory while second data path 530 may correspond to a second class of memory transaction requests for non-system memory. Some examples of transaction requests that CPU 505 may desire to initiate include: input/output (IO) reads to non-system memory, IO writes to non-system memory, memory code reads to system memory, and memory data reads to system memory.

Bridge integrated circuit 515 includes at least one resource, such as a posted write buffer, for servicing transaction requests of at least one of the targets. In one embodiment, bridge integrated circuit 515 includes a first posted write buffer 560 for posting write data for a first target (e.g., to non-system memory). A second posted write buffer 570 may be included for posting write data for a second target (e.g., system memory). Other buffers may also be included, such as one or more posted read buffers (not shown). However, it will be understood that the configuration of posted write buffers in FIG. 5 is merely exemplary and that other buffer configurations may be used in embodiments of the present invention. In particular, it will be understood in the following discussion that some embodiments of the present invention require only one posted write buffer capable of buffering posted writes for at least one of the targets 530 or 535.

Each posted write buffer 560 and 570 has an associated queue (not shown) for holding posted data entries that has a maximum capacity in regards to the total number of data entries and, in some embodiments, the total data size of all entries in the queue. That is to say, either the limited availability of tokens or the limited space in the buffer could be limiting factor, depending upon the implementation. At any particularly point in time, a posted write buffer 560 or 570 may be completely full or have a current remaining available capacity. Thus, for example, if the posted write buffer can hold ten entries of a particular data size and nine entries are stored in the posted write buffer, the posted write buffer has an available capacity for one more entry. A posted write buffer 560 or 570 holds posted data until it is drained, i.e., extracted out of bridge 515 and supplied to its target destination. Thus, the total number of entries and total amount of data stored in a posted write buffer 560 or 570 varies over time as new entries are posted and old entries are drained.

Conventionally, in order to prevent an overflow condition for posted write buffer (e.g. posted write buffer 560), once a posted write buffer is filled to a maximum capacity, the bus agent associated with second front side bus interface 550 will not permit data for a new posted write to be transferred during a data phase to the posted write buffer until the posted write buffer drains. In a conventional front side bus interface protocol, such as that used in the Pentium® front side bus unit interface protocol, the conventional front side bus protocol permits a write to be scheduled even if a posted write buffer is full (e.g., filled to a maximum data capacity) as long as the posted write buffer is guaranteed to clear. For this case, the data phase of the accepted transaction is stalled by a bridge integrated circuit not asserting a signal (e.g., TRDY signal for a PentiumR front side bus unit interface protocol) that prevents data transfer until the posted write buffer is capable of accepted the posted write. This results in a stretched out data phase, which is sometimes referred to as "forming a bubble" in the data phase, because it results in a number of cycles in the data phase for which no data is transmitted while the second front side bus interface waits for the posted write buffer to drain. However, since the front side bus interface has pipelined, in-order execution, this stretched out data phase caused by a full posted write buffer stalls the processing of the data phase for subsequently scheduled transactions in IOQ 554.

Note that IOQ 554 may have queued transaction requests scheduled corresponding to data transfers associated with both first target 535 and second target 538. For example, a transaction with having a bubble in the data phase for a data transfer with a first target 535 corresponding to non-system memory will stall other transactions in IOQ 554, including transactions requests addressed to a second target 538, such as a system memory.

Figure 6:
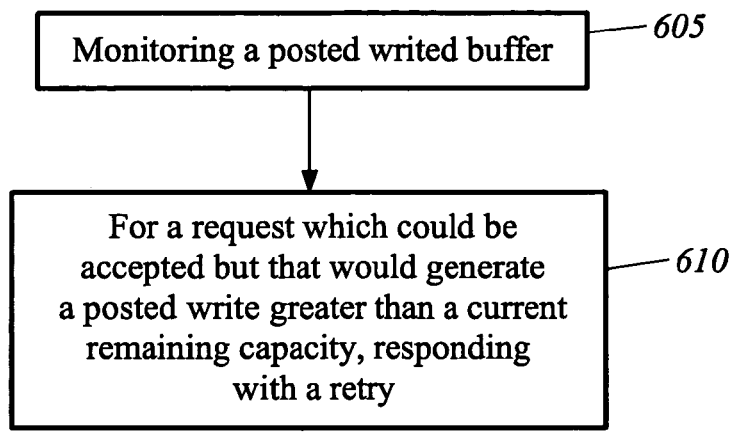
FIG. 6 is a flowchart illustrating processing performed in accordance with one embodiment of the present invention.

Referring to the flow chart of FIG. 6, in one embodiment of the present invention, second front side bus interface unit 550 monitors 605 the status of a posted write buffer, such as posted write buffer 560. Second front side bus interface unit 550 determines the space currently available in the posted write buffer and compares it to a posted write size of a transaction request prior to issuing a response to the transaction request. If a transaction request would generate a posted write that would exceed the current remaining capacity of the posted write buffer 560 and hence generate a bubble, second front side bus interface unit 550 responds 610 to CPU 505 with a retry request. As a result, second front side bus interface unit 550 prevents the generation of a bubble. By issuing a retry, posted write buffer 560 is given time to drain. In the meantime, the data phase of other types of transactions in the IOQ which do not exceed the capacity of the posted write buffer are permitted to proceed, such as system memory code read and data read requests.

Figure 7:
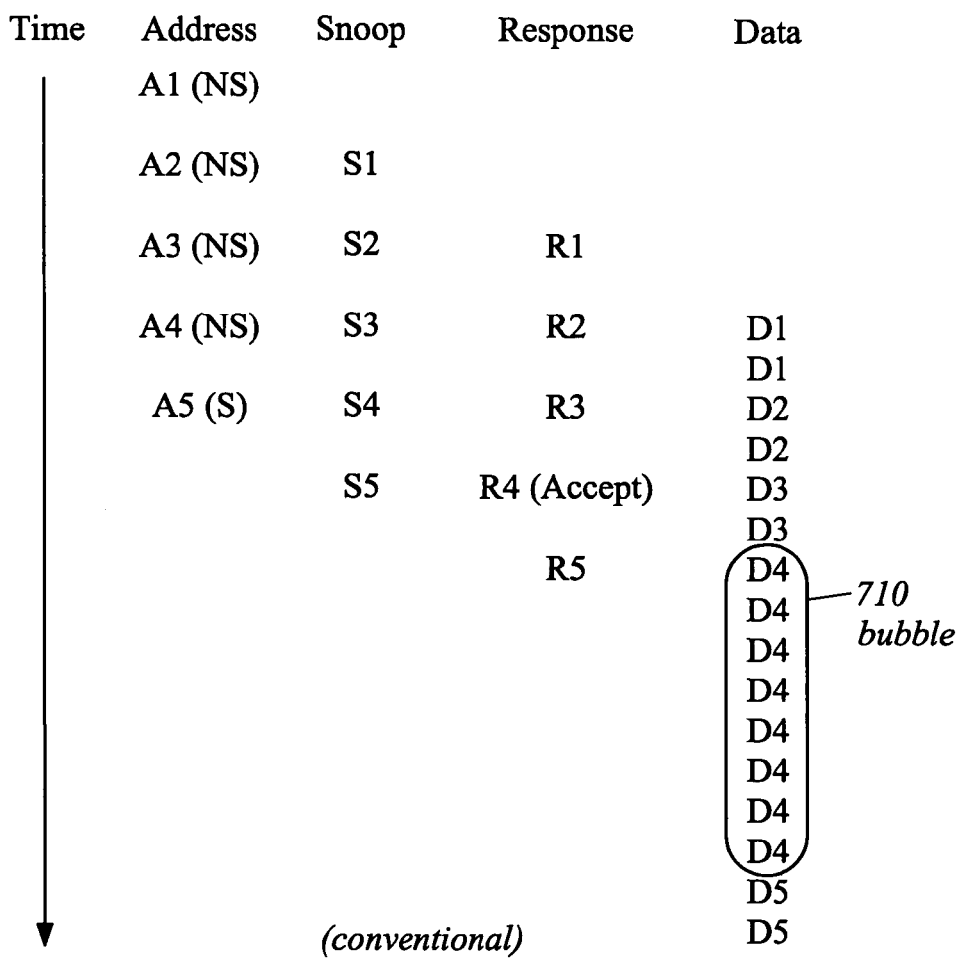
FIG. 7 illustrates the formation of a data bubble in an exemplary sequence of front side bus transactions implemented by a conventional front side bus interface protocol.

Some of the benefits of the present invention may be understood with regards to FIGS. 7 and 7. FIG. 8, illustrates an exemplary sequence of transaction requests handled by a conventional front side bus interface. In the example of FIG. 7, CPU 505 initiates a sequence of five transaction requests to bridge 515. This includes transaction requests addressed to system (S) memory 538 and requests to non-system (NS) memory 535. Each transaction may include an address Ai, snoop phase Si, response phase Ri, and data phase, Di.

In the example of FIG. 7, it is assumed that A4, the fourth transaction request, is a write request to non-system memory 535 that is accepted, as indicated by the accept response R4 (Accept). However, in this example, it is assumed that while the fourth transaction request A4 is accepted and scheduled, the posted write buffer must drain before the posted write data can actually be transferred to the posted write. As a result, the data phase D4 for transaction four, generates a bubble 710 and is stretched out. Thus data phase D4 requires more time to complete than the data phases D1, D2, and D3 of other transactions for which the posted write buffer had space to immediately accept a delivery of data after the response phase. Since the front side bus interface has pipelined, in-order execution of transactions, the data phase D5 for transaction A5, a request (e.g., a code read write or data read) to system memory is stalled until the data phase D4 completes. As a result the average latency for memory transactions is increased, particularly in regards to transactions to system memory.

FIG. 8 illustrates an exemplary sequence of transactions in accordance with one embodiment of the present invention. Transaction requests A1–A7 are initiated sequentially by CPU 505. As in the previous example, of FIG. 7, instructions A1–A3 have conventional response and data phases R1, R2, R3 and D1, D2, and D3 respectively. For transaction A4, the second front side bus interface determines that the posted write buffer for non-system memory does not have sufficient remaining capacity to currently accept the posted write data (even though conventionally the posted write could be accepted and scheduled). Consequently, in accordance with the present invention, the second front side bus interface responds with a retry signal to the CPU, as indicated by the response R4 (Retry). This permits the data phase D5, D6, and D7 for transactions five, six, and seven respectively, that are addressed to system memory to proceed without being stalled. In a subsequent retry, the front side bus response accepts the writing of data to the posted write buffer if the posted write buffer has cleared, as indicated by the R4 (Accept) response and corresponding data phase D4.

In one embodiment, CPU 505 is a hyper-threaded microprocessor emulating two logical processors. An example of a hyper-threaded microprocessor is the Pentium® 4 class of microprocessors, manufactured by the Intel Corporation of Santa Clara, Calif. Thus, for example, a first thread 580 can include a data read or code fetch to system memory 538 while a second thread 585 can include a data write or data read to non-system memory 535. Thus the present invention prevents a read from one thread from being stalled behind a write of the other thread. In one embodiment, CPU 505 is further adapted to preferentially present pending read requests in at least one of the threads for a pre-selected time interval upon detection of a retry. This embodiment permits read requests to be scheduled and processed while the posted write buffer drains.

In some embodiments, CPU 505 is a microprocessor that implements a front side bus interface protocol based on the Pentium® front side bus interface protocol. The Pentium® front side bus interface protocol is a front side bus interface protocol standard promoted by the Intel Corporation, and is described in the book entitled: "Pentium® Pro and Pentium® II System Architecture", second edition, chapters 8–17, by Tom Shanley, Addison-Wesley (1998), the contents of which are hereby incorporated by reference. It will thus be understood that in these embodiments, that second front side bus interface 550 implements a front side bus interface that is compatible with the Pentium® front side bus interface protocol. However, it will also be understood that the present invention may also be practiced with other front side bus interface protocols as well.

Embodiments of the present invention are useful for a variety of applications. However, in some graphics systems, there is a recurring need for CPU 505 to initiate transaction requests corresponding to writing large amounts of data to non-system memory, which increases the likelihood in a conventional front side bus interface protocol of filling a posted write buffer. Moreover, in such systems there is also a recurring need for CPU 505 to read code and data from non-system memory. Embodiments of the present invention are thus useful in graphics systems to reduce transaction latency, particularly for code and data fetches from system memory.

While the present invention includes embodiments in which units 535 and 538 coupled to a bridge corresponding to non-system memory and system memory, respectively, more generally it will be understood that embodiments of the present invention may include other types of units coupled to the bridge as long as at least one of the units requires a posted write buffer for posted writes.

It will be understood that in one embodiment of the present invention, that second front side bus interface unit 550 may include an enable input to permit the retry functionality to be turned off, if desired. An enable input permits, for example, front side bus interface unit 550 to be operated as a conventional front side bus interface.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An integrated circuit performing a bridge function, comprising:

a front side bus interface unit disposed in said integrated circuit operative to act as an interface for a hyper-threaded central processing unit (CPU), said front side bus interface operative to initiate transactions with at least two units bridged to said integrated circuit, said front side bus interface unit executing a front side bus interface protocol having a request phase to receive a transaction request from said hyper-threaded CPU, a response phase for said integrated circuit to respond to said transaction request, and a data phase for a data transfer associated with an accepted transaction, said front side bus interface protocol being a pipelined protocol with an in-order transaction queue in which only one data phase of one transaction may proceed at any one time; and a posted write buffer for posting writes for at least one of said units, said posted write buffer having a maximum data capacity for queued posted writes beyond which a transaction request generating another posted write may be accepted but for which an associated data transfer phase is held up until said posted write buffer at least partially drains to accommodate said another posted write;

said front side bus interface unit configured to monitor said posted write buffer and respond to a transaction request that would generate a new posted write exceeding a current remaining capacity of said posted write buffer with a retry response;

wherein said integrated circuit has a mode of operation for said hyper-threaded CPU in which transaction requests of a thread that would schedule posted writes to a non-system memory which would stall completion of other transaction requests are retried at a later time by said integrated circuit to facilitate servicing another thread comprising a transaction request for reading a system memory.

2. The integrated circuit of claim 1, wherein said integrated circuit comprises at least a portion of a chipset.

3. The integrated circuit of claim 1, wherein a first unit is a system memory and a second unit is a non-system memory.

4. The integrated circuit of claim 3, wherein said posted write buffer is a posted write buffer for said non-system memory.

5. The integrated circuit of claim 1, wherein said front side bus interface protocol is compatible with a Pentium® front side bus interface protocol.

6. The integrated circuit of claim 1, wherein said capacity of said posted write buffer comprises at least one of a number of entries in a queue and a data size.

7. A system, comprising:
a central processing unit (CPU) having a first front side bus interface unit;
a bridge integrated circuit coupled to said CPU by a front side bus;
a system memory coupled to said bridge integrated circuit;
a non-system memory coupled to said bridge integrated circuit;
a second front side bus interface unit disposed in said bridge integrated circuit operative to act as an interface for said CPU to initiate memory transactions with both said system memory and said non-system memory, said second front side bus interface unit executing a front side bus interface protocol having a request phase for said CPU to issue a transaction request, a response phase for said bridge integrated circuit to respond to said transaction request, and a data phase for said CPU to perform a data transfer associated with an accepted transaction, said front side bus interface protocol being a pipelined protocol with an in-order transaction queue in which only one data phase of one transaction may be processed at any one time; and
a posted write buffer disposed in said bridge integrated circuit for said CPU to post writes to said non-system memory, said posted write buffer having a maximum capacity for buffering posted writes beyond which said bridge integrated circuit may accept another posted write but for which data transfer is held up until said posted write buffer at least partially drains to accommodate said another posted write;
said second front side bus interface unit configured to monitor said posted write buffer and in response to detecting a transaction request for a posted write to said posted write buffer that would exceed a current remaining capacity of said posted write buffer, responding to said transaction request with a retry response, whereby said CPU is instructed to retry said transaction at a later time;
wherein said CPU comprises a hyper-threaded microprocessor in which for a first thread comprising a transaction request for reading system memory and a second thread comprising a transaction request for writing to non-system memory transactions generating posted write requests addressed to said non-system memory that would stall data phases associated with other transactions are prevented.

8. The system of claim 7, wherein said CPU is adapted to preferentially issue read transaction requests in response to detecting a retry signal from said bridge integrated circuit.

9. The system of claim 7, wherein said bridge integrated circuit further comprises: a posted write buffer for system memory.

10. The system of claim 7, wherein said first front side bus interface unit of said CPU implements a Pentium® front side bus interface protocol and said second front side bus interface unit implements a front side bus interface protocol compatible with said Pentium® front side bus interface protocol.

11. A method of utilizing a pipelined, in-order front side bus interface protocol, comprising:
monitoring a current remaining data capacity of a posted write buffer having a maximum data capacity for accepting posted writes beyond which data transfer in a data phase for posting data to said posted write buffer is delayed to permit said posted write buffer to drain to accommodate a new posted write entry;
for a first thread requiring access to a system memory, accepting a transaction request to perform a data transfer with said system memory;
for a second thread requiring access to a non-system memory, accepting a transaction request that does not generate a posted write to said non-system memory which exceeds said current remaining capacity of said posted write buffer; and
for said second thread, requesting a retry at a later time in response to a transaction request that would generate a posted write to said non-system memory which exceeds said current remaining capacity of said posted write buffer.

12. The method of claim 11, wherein for said first thread said accepting a transaction comprises: accepting a transaction request to read system memory.

13. The method of claim 11, wherein for said first thread said accepting a transaction comprises: accepting a transaction request to write system memory.

14. A system, comprising:
a bridge integrated circuit operative to couple a hyper-threaded central processing unit (CPU) to a system memory and a non-system memory;
a bus interface unit disposed in said bridge integrated circuit operative to act as an interface for said hyper-threaded CPU to initiate memory transactions with both said system memory and said non-system memory, said bus interface unit executing a bus interface protocol having a request phase for said hyper-threaded CPU to issue a transaction request, a response phase for said bridge integrated circuit to respond to said transaction request, and a data phase for said hyper-threaded CPU to perform a data transfer associated with an accepted transaction, said bus interface protocol being a pipelined protocol with an in-order transaction queue in which only one data phase of one transaction may be processed at any one time; and
a posted write buffer disposed in said bridge integrated circuit for said hyper-threaded CPU to post writes to said non-system memory, said posted write buffer having a maximum capacity for buffering posted writes beyond which said bridge integrated circuit may accept another posted write but for which data transfer is held up until said posted write buffer at least partially drains to accommodate said another posted write;
said bus interface unit configured to monitor said posted write buffer and in response to detecting a transaction request of a thread for a posted write to said non-system memory that would exceed a current remaining capacity of said posted write buffer, responding to said transaction request with a retry response, whereby said hyper-threaded CPU is instructed to retry said transaction at a later time;
wherein a transaction request of a first thread addressed to said system memory is facilitated by instructing said hyper-threaded CPU to retry a transaction request for a posted write of a second thread addressed to said non-system memory that would stall the completion of said transaction request of said first thread addressed to said system memory.

* * * * *